United States Patent [19]
Ahmed

[11] 3,902,079
[45] Aug. 26, 1975

[54] SWITCHING CIRCUIT HAVING MULTIPLE OPERATING MODES

[75] Inventor: Adel Abdel Aziz Ahmed, Annandale, N.J.

[73] Assignee: RCA Corporation, New York, N.Y.

[22] Filed: Jan. 21, 1974

[21] Appl. No.: 435,161

[52] U.S. Cl. ................ 307/255; 307/254; 307/289; 307/313
[51] Int. Cl.[2] .......................................... H03K 17/00
[58] Field of Search ........... 307/240, 255, 313, 289, 307/254; 330/13

[56] References Cited

UNITED STATES PATENTS

| | | | |
|---|---|---|---|
| 3,157,797 | 11/1964 | Eshelman | 307/255 |
| 3,235,750 | 2/1966 | Anderson et al. | 307/255 |
| 3,508,081 | 4/1970 | Matsuda | 307/255 |
| 3,766,410 | 10/1973 | Elsaesser | 307/255 |

*Primary Examiner*—Michael J. Lynch
*Assistant Examiner*—B. P. Davis
*Attorney, Agent, or Firm*—H. Christoffersen; S. Cohen

[57] ABSTRACT

Complementary transistors, each connected at its base to an input terminal and the collector of the other and one connected at its emitter to an operating voltage source. The other emitter is connected to ground through a controllable impedance and its value controls the circuit operation. It determines whether a path between one of the input terminals and ground will be open and permit the circuit to latch or will close, and if closed, whether the additional path will cause the circuit to remain latched and limit to a given maximum value the load current or will cause the circuit to unlatch.

9 Claims, 6 Drawing Figures

SWITCHING CIRCUIT HAVING MULTIPLE OPERATING MODES

This invention relates to switching circuits and particularly to switching circuits having multiple operating modes.

Useful applications exist for a switching circuit having multiple operating modes. For example, a switching circuit having turn-on, turn-on-inhibit, turn-off and current limiting operating modes is particularly useful in cross-point switching and other applications. The present invention deals with simple circuits meeting this need and which can be implemented either in discrete element or integrated circuit form.

A switching circuit in accordance with an embodiment of the present invention includes a switch initially in a non-conductive state, having at least one input terminal for receiving a turn-on signal for placing the switch in a conductive state. A feedback path in the switch provides a regenerative feedback signal for maintaining the switch in its conductive state. Circuit means, responsive jointly to the conductive state of the switch and to a control signal manifestation, modifies the feedback signal in one case to inhibit the regenerative feedback signal and in another case to enable the regenerative feedback signal.

The invention is illustrated in the accompanying drawings wherein like reference numbers represent like elements and in which.

Figure 1:
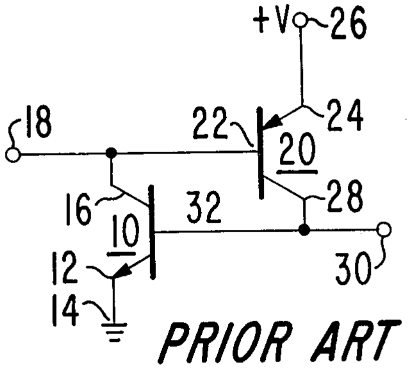
FIG. 1 is a circuit diagram of a prior art latching circuit.

The prior art latch of FIG. 1 includes a pair of complementary transistors, the collector of each being connected to the base of the other with provision for applying an operating potential to the emitter and a trigger signal to the base of each transistor. Specifically, NPN transistor 10 is connected at its emitter 12 to ground 14 and at its collector 16 to circuit point 18 and to the base 22 of PNP transistor 20. Transistor 20 is connected at its emitter 24 to circuit point 26 and at its collector 28 to circuit point 30 and to the base 32 of NPN transistor 10.

Upon application of an operating potential +V to circuit point 26 (relative to the potential of ground 14) either transistor may be turned on by an appropriate trigger pulse applied to its base. For example, a negative trigger pulse relative to +V applied to circuit point 18 will turn on transistor 20. Conversely, a positive trigger pulse applied to circuit point 30 relative to ground 14 will turn on transistor 10. The collector-to-base feedback path between transistors 10 and 20 provides regenerative feedback to maintain both transistors in a conductive state after the trigger pulse is removed. Turn-off may be achieved by removing the operating voltage +V from circuit point 26 or by interrupting the base current flow to either transistor.

A number of problems exist in practical implementation of the prior art latch due, for example, to the non-ideal behavior of the transistors (such as leakage) and the effects of capacitive coupling. These problems exist, to a certain extent, in the customary forms of circuit construction such as (1) the discrete component form, (2) the monolithic integrated form (vertical NPN, lateral PNP) and (3) the four layer (PNPN) monolithic form. For example, collector-to-emitter leakage currents (inherent in practical transistors and dependent on temperature) tend to increase as the operating potential increases. Since the leakage currents of each transistor represents a base input current to the other transistor of the pair, this effect tends to limit the maximum value of operating potential that the latch can withstand without self-turn-on. Although the effect of transistor leakage currents may be minimized by connecting a resistor across the base-to-emitter electrodes of one or both of the transistors, this solution both reduces the base sensitivity and requires an additional expensive and space consuming component.

Capacitive coupling among the various electrodes of the transistors is particularly prevalent in monolithic forms of the prior art latch and tends to limit the maximum rate at which the supply voltage +V may be applied (dV/dt) without resulting in undesirable self-turn-on. Where, for example, the operating potential is modulated (as may occur in some switching applications) the maximum modulation frequency and thus the information handling capability of the switch may be adversely limited by the dV/dt "withstand capability" of the latch which is limited to an extent by the interelectrode capacitive coupling.

Figure 2:
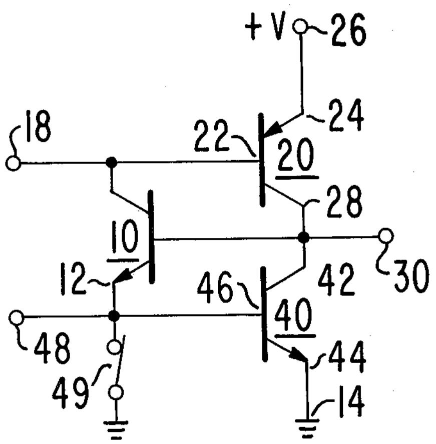
FIGS. 2 – 6 are circuit diagrams of switching circuits embodying the invention.

The switching circuit of the present invention, one embodiment of which is shown in FIG. 2, substantially reduces the effects of leakage and capacitance inherent in the prior art latching circuit and provides additional operating modes of: (1) turn-on inhibit; (2) turn-off; and (3) current limiting. FIG. 2 includes an additional NPN transistor 40 having the collector 42 and emitter 44 thereof connected to circuit point 30 and ground 14, respectively. Base 46 of transistor 40 is connected to control terminal 48. Emitter 12 of transistor 10, formerly connected to ground 14, is connected instead to circuit point 48. Transistor 40 has a current gain greater than that of transistor 20.

Assume initially that a positive operating potential is applied to circuit point 26 and that control terminal 48 is grounded. Transistor 40, under these assumptions, will be biased off and transistors 10 and 20 may be triggered on, as in the prior art circuit, by application of appropriate trigger pulses to their respective bases and will remain on in a latched condition (each saturated), after the removal of a trigger pulse, due to the regenerative feedback effects previously discussed.

Turn-off may be accomplished by breaking the control terminal 48 to ground connection. The means for breaking the connection may be a switch 49 which, in practice, may be an electronic switch. (More broadly speaking, element 49 may be an electronically controlled variable impedance means as discussed later). When the connection is broken, the emitter current of transistor 10 is diverted to the base of transistor 40. Since the emitter current of transistor 10 is equal to the sum of its collector and base currents, and since its collector current is equal to the base current of transistor 20, it follows that the base current supplied to transistor 40 in this case cannot be less than the base current of transistor 20. Since transistor 40 has a higher current gain than transistor 20 it will be saturated to a greater extent than transistor 20. The "hard" saturation of transistor 40 reduces the potential of circuit point 30 and thus tends to turn transistor 10 off.

As transistor 10 turns off, it reduces the base currents of transistors 20 and 40 and this action continues until the regenerative feedback between transistors 10 and 20 is no longer adequate to sustain a latched condition. The action of transistor 40 thus effectively prevents regenerative feedback between transistors 10 and 20 when control terminal 48 is open circuited so that the circuit of FIG. 2 cannot be placed in a sustained regenerative condition either in response to trigger pulses or in response to a rapid rate of change of operating potential.

The above discussion illustrates that when control terminal 48 is essentially grounded, the circuit may be triggered on in response to trigger signals (turn-on mode) and that when control terminal 48 is essentially open circuited, the circuit cannot be triggered to a latched on condition (turn-on inhibit mode) or, if previously on, the circuit will be turned off (turn-off mode).

Figure 3:
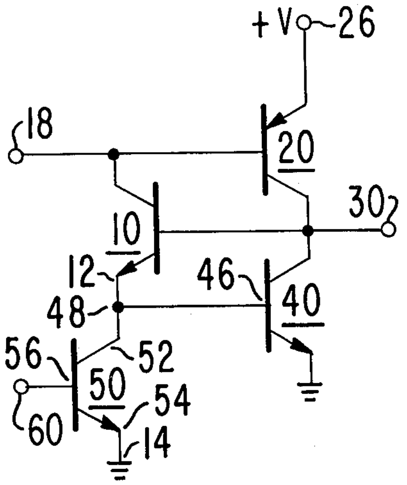

FIG. 3 (and FIGS. 4 and 6 to be later discussed) illustrates a current limiting operating mode achieved by the present invention by connecting control terminal 48 to a suitable source of reference potential (such as ground 14) by the conduction path of a variable impedance element.

The variable impedance element preferably should have an impedance characterized in being of a relatively low value for current flow therethrough of less than a given value and being of a substantially higher value for current flow therethrough of greater than the given value. It is preferred that the threshold level at which the variable impedance element begins to change impedance values be controllable in accordance with a control signal. An example of a variable impedance element (transistor 50) having the above characteristics and which therefore permits the current limiting operating mode of the circuit of FIG. 2, is shown in place in the circuit in FIG. 3.

In FIG. 3 collector 52 of NPN transistor 50 is connected to control terminal 48. Emitter 54 and base 56 of transistor 50 are connected to ground 14 and control terminal 60, respectively. Transistor 50 has the characteristics of the variable impedance element previously discussed i.e., when saturated, the impedance of its collector-to-emitter path is relatively low and when unsaturated, the collector-to-emitter path impedance is relatively high. Saturation occurs in transistor 50 when its collector current is less than the product of its base current multiplied by its current gain. Since the base current is controlled in accordance with signals supplied to control terminal 60, the saturation threshold is therefore controllable.

In operation, assume that a positive operating potential +V is applied to circuit point 26 and that a control current of a value sufficient to saturate transistor 50 is applied to control terminal 60. When transistors 10 and 20 are latched into a conductive state, a load current flows from circuit point 26 through the emitter-to-collector path of transistor 20 and the base-to-emitter path of transistor 10 to terminal 48. Since transistor 50 is assumed to be saturated, substantially all of this current will flow through its collector-to-emitter path to ground 14 and substantially no current will be diverted to the base of transistor 40. Transistor 40 will remain off and transistors 10, 20 and 50 will remain saturated. This condition continues as long as the load current flowing to the collector of transistor 50 is less than the product of the current supplied to control terminal 60 multiplied by the current gain of transistor 50. If the operating potential should increase causing the load current to increase to the saturation threshold value of transistor 50, that transistor will thereafter conduct a substantially constant current limited by the base current supplied to it. Any further increase in load current is thereafter diverted to base 46 of transistor 40. This tends to turn transistor 40 on which reduces the base current of transistor 10 and transistor 20 as previously described. Thus, load currents in excess of the saturation current of transistor 50 tend to turn on transistor 40 which thereafter regulates the feedback between transistors 10 and 20 to maintain a constant current flow from the source of operating potential to ground 14. Since the current gain of transistor 50 is typically high, it is apparent that a relatively small control current applied to control terminal 60 may be employed to control a much larger maximum or "limit" value of current which is permitted to flow from terminal 26 to ground. Where relatively precise control of the limit value of load current is needed, the high current gain of transistor 50 may be undesirable. The following figure illustrates the use of a current mirror to achieve precise control of the limit value of load current.

Figure 4:
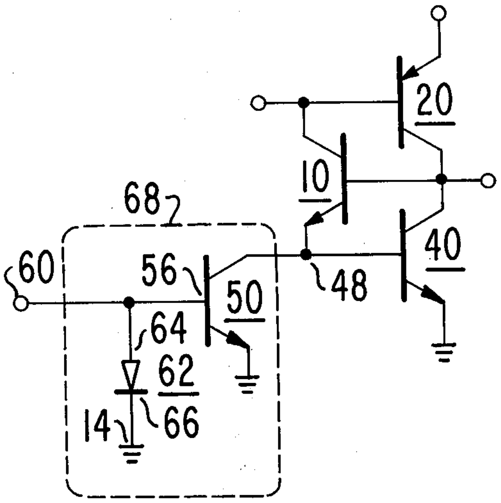

FIG. 4 is similar to FIG. 3 but additionally includes diode 62 having its anode 64 connected to control terminal 60 and its cathode 66 connected to ground 14. Diode 62 and transistor 50 indicated in dashed box 68 form a well known "current mirror" circuit. Where the junction areas of diode 62 and the base-emitter diode of transistor 50 are approximately equal, the current gain of the "mirror" is substantially equal to minus one. As an example, a one milliampere input current to control terminal 60 will produce a voltage at base 56 of transistor 50 of a value sufficient to bias transistor 50 to conduct a collector current of one milliampere. In a sense, transistor 50 is "primed" to conduct such a current. If a lesser current is supplied to its collector, transistor 50 will saturate. If a greater current is available at its collector, transistor 50 will be unsaturated and will conduct only one milliampere. As previously explained, any excess load current in this latter case is diverted to the base of transistor 40 which, in turn, regulates the feedback between transistors 10 and 20 to maintain a constant load current.

As in the circuit of FIG. 2, it is necessary in FIG. 3 that transistor 40 have a higher current gain than transistor 20 to achieve the turn-off operating mode as previously discussed. Different current gains may be achieved by appropriate selection of transistors 20 and 40, or by variation of design parameters during manufacture. In particular, where precise control of the ratio of the current gains is desired, diodes may be placed across one or both of the base-to-emitter junctions of transistor 20 or 40 as illustrated in FIG. 5.

Figure 5:
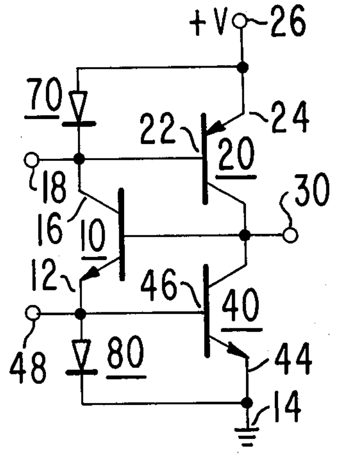

In FIG. 5 diodes 70 and 80 are connected in parallel with the base-to-emitter junctions of transistors 20 and 40 respectively, each diode being poled in the same sense as the corresponding junction. Transistor 20 and diode 70 form a first current mirror having a current gain determined by the ratio of base emitter junction area of transistor 20 to the junction area of diode 70. Similarly transistor 40 and diode 80 form a second current mirror also having a gain determined by their ratio of their junction areas. The gain of the second "current mirror" is selected to be greater than that of the first current mirror so that the circuit operation is substantially the same as previously discussed with regard to FIG. 2.

Figure 6:
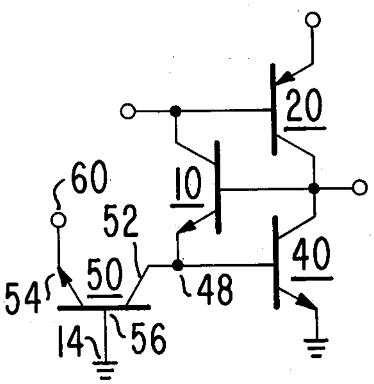

FIG. 6 illustrates a variation of the circuit of FIG. 3 in which transistor 50 is employed in a common base configuration rather than a common emitter configuration. In FIG. 6 collector 52 base 56 and emitter 54 of transistor 50 are connected, respectively, to control terminal 48, ground 14 and control terminal 60. Circuit operation is as previously described for FIG. 3 except that the control signal applied to control terminal 60 is of a negative value (relative to ground 14) to turn transistor 50 on. This feature allows use of the present switching circuit with control sources having negative output voltage levels. in In the discussion of the various embodiments of the present invention it has been emphasized that transistor 40 must have a current gain greater than that of transistor 20. The term "current gain" is meant to refer generally to the effective current gains of the transistor concerned. In FIG. 5, for example, transistor 20 may have a higher value of actual current gain than transistor 40 but the diodes are selected to modify the actual current gains so that the "effective" current gain of transistor 40 is greater than that of transistor 20. Other means may be employed to achieve this purpose. For example, if transistor 20 has a higher current gain than transistor 40, its gain may be reduced to a lesser value by either placing a diode across its base-emitter junction as shown nin FIG. 5 or by placing a resistor across its base-emitter junction. In the alternative, rather than decreasing the current gain of transistor 20 to achieve the desired relationship, it is also possible to increase the current gain of transistor 40. For example, the current gain of transistor 40 can be effectively increased by connecting an additional transistor to it in a well known Darlington configuration. In other words, the desired current gain relationship may be achieved by (1) designing transistor 40 to have an actual gain greater than transistor 20, (2) by reducing the effective current gain of transistor 20 or (3) by increasing the effective current gain of transistor 40.

As a practical matter, present day integrated circuit processing techniques are known which inherently produce relatively lower beta PNP transistors and higher beta NPN transistors due to the different constructions of the devices. Thus, the required current gain condition may be fulfilled in practice, without any special measures being necessary, when the present invention is implemented as an integrated circuit.

Although bipolar transistors are shown as the amplifying devices in the various embodiments, other suitable amplifying devices may be employed instead. In some applications, for example, transistor 50 may be replaced by a field-effect transistor. In other applications transistors 10 and 20 may be replaced by a suitable reverse blocking tetrode thyristor. The diodes, such as 70 and 80, in practice, may be transistors connected to operate as diodes. The entire circuit, of course, lends itself well to straightforward implementation in integrated circuit form due to the absence of capacitors and resistors which generally require relatively large amounts of circuit area when integrated.

What is claimed is:

1. A switching circuit having multiple operating modes comprising:

first and second circuit points for receiving a signal thereacross to be switched;

a third circuit point;

switch means connected between said first and third circuit points, said switch means having a trigger electrode responsive to a trigger signal for placing said switch means in a conductive state and having also a regenerative feedback path for maintaining said switch means in said conductive state;

first variable impedance means having a controllable current path connected between a point in said regenerative feedback path and said second circuit point, said first variable impedance means having a control electrode connected to said third circuit point for controlling the impedance of said current path:

second variable impedance means having a conduction path connected between said second and third circuit points and a control electrode for controlling the conduction thereof;

a first circuit control terminal connected to said control electrode of said second variable impedance means for receiving a circuit operating mode control signal; and a second circuit control terminal connected to said trigger electrode of said switch means for initially receiving said trigger signal and applying said trigger signal to said trigger electrode.

2. The switching circuit recited in claim 1 wherein said switch means comprises:

first and second complementary transistors, each having base, emitter and collector electrodes, the collector electrode of each being connected to the base electrode of the other, the emitter electrode of the second transistor being connected to said first circuit point, the emitter electrode of the first transistor being connected to said third circuit point, said controllable current path of said first variable impedance means being connected between said second circuit point and said base electrode of said first transistor; and wherein said second circuit control terminal is connected to a selected one of the base electrodes of said first and second complementary transistors.

3. The switching circuit recited in claim 2 wherein said first variable impedance means comprises:

a third transistor having base, emitter and collector electrodes connected, respectively, to said third circuit point, said second circuit point and said base electrode of said first transistor, said third transistor being of the same conductivity type as said first transistor and having an effective current gain of a value greater than that of said second transistor.

4. The switching circuit recited in claim 3 wherein said second variable impedance means comprises a fourth transistor having base, emitter and collector electrodes connected, respectively, to said first circuit control terminal, said second circuit point and said third circuit point.

5. The switching circuit recited in claim 3 wherein said second variable impedance means comprises:

a fourth transistor having base, emitter and collector electrodes connected, respectively, to said second circuit point, said first circuit control terminal and said third circuit point.

6. The switching circuit recited in claim 3 wherein said second variable impedance circuit means comprises:

a current mirror having an input terminal connected to said first circuit control terminal, an output terminal connected to said third circuit point and a reference terminal connected to said second circuit point.

7. The switching circuit recited in claim 6 wherein said current mirror comprises:

a fourth transistor having base, emitter and collector electrodes, the collector and emitter electrodes being connected, respectively, to said third circuit point and to said second circuit point, said base electrode thereof being connected to said first circuit control terminal; and a diode connected between said base and said emitter electrodes of said fourth transistor, said diode being poled in a sense to effectively reduce the current gain of said fourth transistor.

8. The combination recited in claim 3 further comprising at least one diode connected across the base-to-emitter electrodes of a selected one of said second and third transistors for causing the effective current gain of the third transistor to be greater than that of the second transistor.

9. The combination recited in claim 3 further comprising a separate diode connected across the base and emitter electrodes of each of said second and third transistors for controlling the ratio of the effective current gains of said second and third transistors.

* * * * *